United States Patent
Kawai et al.

(10) Patent No.: US 7,565,798 B2
(45) Date of Patent: Jul. 28, 2009

(54) EXHAUST GAS PURIFYING APPARATUS AND METHOD IN INTERNAL COMBUSTION ENGINE

(75) Inventors: Kenji Kawai, Kariya (JP); Hisanobu Suzuki, Toyota (JP)

(73) Assignees: Kabushiki Kaisha Toyota Jidoshokki, Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 308 days.

(21) Appl. No.: 11/486,735

(22) Filed: Jul. 14, 2006

(65) Prior Publication Data

US 2007/0169763 A1 Jul. 26, 2007

(30) Foreign Application Priority Data

Jul. 14, 2005 (JP) ............................. 2005-206025

(51) Int. Cl.
*F02M 25/06* (2006.01)
*F02B 47/08* (2006.01)

(52) U.S. Cl. ........................ 60/278; 60/324; 123/568.2

(58) Field of Classification Search ................ 60/278, 60/324, 602, 605.2; 123/568.17, 568.18, 123/568.2
See application file for complete search history.

(56) References Cited

U.S. PATENT DOCUMENTS

| | | | |
|---|---|---|---|
| 3,943,710 A | | 3/1976 | Lange .......................... 60/288 |
| 5,562,086 A | * | 10/1996 | Asada et al. ............ 123/568.21 |
| 6,917,873 B2 | * | 7/2005 | Itoyama ...................... 701/108 |
| 7,305,828 B2 | * | 12/2007 | Todoroki et al. ............... 60/612 |
| 2005/0028515 A1 | * | 2/2005 | Fukuma et al. ................ 60/276 |
| 2005/0274366 A1 | * | 12/2005 | Sato ......................... 123/568.2 |
| 2007/0028901 A1 | * | 2/2007 | Watakabe et al. ....... 123/568.12 |
| 2007/0039314 A1 | * | 2/2007 | Mizuguchi ................... 60/285 |
| 2007/0079607 A1 | * | 4/2007 | Suzuki et al. ................ 60/299 |
| 2007/0193564 A1 | * | 8/2007 | Takahashi et al. ........ 123/568.2 |

FOREIGN PATENT DOCUMENTS

EP 1308617 A1 5/2003

(Continued)

OTHER PUBLICATIONS

European Search Report dated Oct. 27, 2006 issued by European Patent Office for application No. 06117225.0-2311.

*Primary Examiner*—Thomas E Denion
*Assistant Examiner*—Jonathan Matthias
(74) *Attorney, Agent, or Firm*—Locke Lord Bissell & Liddell LLP (57) ABSTRACT

When conditions for regenerating purifiers are established, a control computer first causes an addition nozzle to supply a reducing agent to a first exhaust path. At this time, the control computer reduces a vane opening degree in a first supercharger and increases a vane opening degree in a second supercharger. Accordingly, the flow rate of exhaust gas discharged to the outside from the first exhaust path is reduced, and the flow rate of exhaust gas flowing to the intake path via a first exhaust gas supply path is increased. Also, the flow rate of exhaust gas discharged to the outside from a second exhaust path is increased, and the flow rate of exhaust gas flowing to the intake path via a second exhaust gas supply path is reduced. As a result, the purifiers are regenerated in a reliable manner, while suppressing variations in the flow rate of exhaust gas supplied to the intake path.

15 Claims, 7 Drawing Sheets

FOREIGN PATENT DOCUMENTS

| | | |
|---|---|---|
| EP | 1498594 | 1/2005 |
| JP | 50-013718 | 2/1975 |
| JP | 03-281929 | 12/1991 |
| JP | 04-132867 | 5/1992 |
| JP | 11-294145 | 10/1999 |

\* cited by examiner

EXHAUST GAS PURIFYING APPARATUS AND METHOD IN INTERNAL COMBUSTION ENGINE

BACKGROUND OF THE INVENTION

The present invention relates to an exhaust gas purifying apparatus and method in an internal combustion engine in which a plurality of exhaust paths are arranged in parallel, and purifiers purifying exhaust gas are respectively provided in the plurality of exhaust paths.

An exhaust gas purifying apparatus has been conventionally utilized in which purification of exhaust gas is carried out by arranging a catalyst in the exhaust path of the engine. A part of equipment such as V-type engines employs a structure in which a plurality of exhaust paths are arranged in parallel. For example, an exhaust gas purifying apparatus in which a catalyst device is provided in each of a pair of exhaust paths arranged in parallel is disclosed in Japanese Laid-Open Patent Publication No. 50-13718 and Japanese Laid-Open Patent Publication No. 3-281929.

In Japanese Laid-Open Patent Publication No. 11-294145 is disclosed an in-line four cylinder diesel engine. When regenerating the purifying apparatus utilizing the catalyst provided in the exhaust path, a reducing agent is supplied to the purifying apparatus, and control for reducing an exhaust flow rate is executed by lowering the opening degree of an exhaust throttle valve. If the exhaust flow rate is reduced, regeneration efficiency of the purifying apparatus utilizing the catalyst is enhanced (it is possible to reduce the amount of reducing agent). However, in a case where the degree of opening of the exhaust throttle valve is simply lowered, engine output is reduced and torque shock is generated. Accordingly, a compensating countermeasure has been devised so as to increase the amount of a main fuel injection supplied to a combustion chamber of the engine as well as increasing a flow rate of an exhaust gas supplied from an exhaust path to an intake path.

However, in order to reduce the exhaust flow rate, since it is necessary to reduce the amount of fresh air reaching the engine, there is a risk of a deterioration in engine emissions such as an increase in smoke.

SUMMARY OF THE INVENTION

The objective of the present invention is to regenerate a purifier without deteriorating engine emissions.

To achieve the foregoing objective and in accordance with one aspect of the present invention, an exhaust gas purifying apparatus in an internal combustion engine having an intake path, and first and second exhaust paths is provided. The exhaust paths are arranged in parallel. The apparatus includes an exhaust gas purifier that is provided at least in the first exhaust path, a first exhaust gas supply path for supplying exhaust gas from the first exhaust path to the intake path, a second exhaust gas supply path for supplying exhaust gas from the second exhaust path to the intake path, a merging portion, a discharge flow rate adjuster, a supply flow rate adjuster, and a control section. At the merging portion, the exhaust gas supplied to the intake path from the first exhaust path and the exhaust gas supplied to the intake path from the second exhaust path merge. The discharge flow rate adjuster adjusts a flow rate of exhaust gas discharged from the first exhaust path. The supply flow rate adjuster adjusts a flow rate of exhaust gas supplied to the intake path via the second exhaust gas supply path. The control section controls the discharge flow rate adjuster and the supply flow rate adjuster. When a process for regenerating the purifier is executed, the control section controls the discharge flow rate adjuster for reducing the flow rate of exhaust gas discharged from the first exhaust path, and controls the supply flow rate adjuster for reducing a flow rate of exhaust gas supplied to the intake path via the second exhaust gas supply path.

In accordance with another aspect of the present invention, an exhaust gas purifying method in an internal combustion engine having an intake path, first and second exhaust paths arranged in parallel, and an exhaust gas purifier provided at least in the first exhaust path, is provided. The method includes: supplying exhaust gas from the first exhaust path to the intake path through a first exhaust gas supply path; supplying exhaust gas from the second exhaust path to the intake path through a second exhaust gas supply path; causing the exhaust gas supplied to the intake path from the first exhaust path and the exhaust gas supplied to the intake path from the second exhaust path to merge; executing a process for regenerating the purifier; and reducing the flow rate of exhaust gas discharged from the first exhaust path and the flow rate of exhaust gas supplied to the intake path via the second exhaust gas supply path, when the process for regenerating the purifier is executed.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A description will be given below of a first embodiment obtained by embodying the present invention in a diesel engine with reference to FIGS. 1A to 3.

Figure 1A:
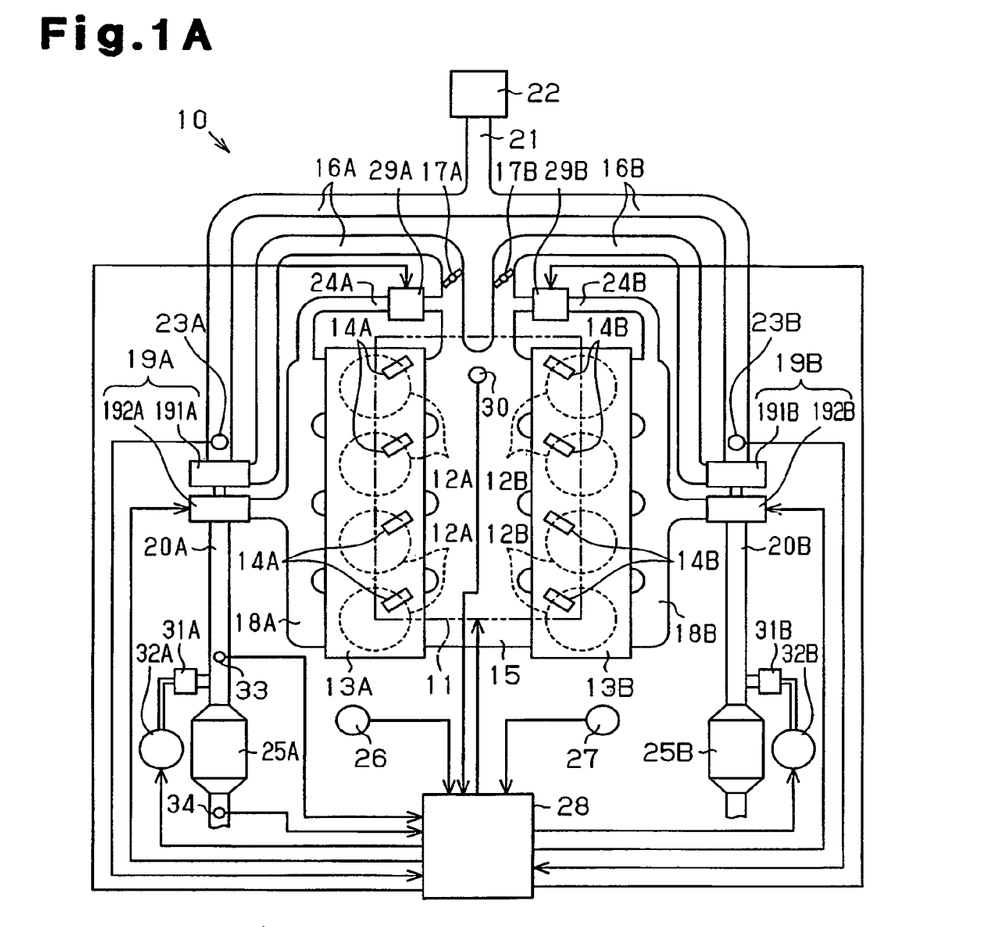
FIG. 1A is an overall view showing an exhaust gas purifying apparatus in accordance with a first embodiment of the present invention.

As shown in FIG. 1A, an internal combustion engine 10 mounted on a vehicle is provided with a plurality of cylinders 12A and 12B, and a plurality of cylinders 12A and 12B are separated into two groups. A cylinder head 13A is provided to correspond to one of the groups of the cylinders, or the cylinders 12A. A cylinder head 13B is provided to correspond to the other group of the cylinders, or the cylinders 12B. A fuel injection nozzle 14A is attached to each cylinder 12A, and a fuel injection nozzle 14B is attached to each cylinder 12B. The fuel injection nozzles 14A and 14B inject fuel into the respective cylinders 12A and 12B. Reference numeral 11 denotes a fuel injection apparatus that includes the fuel injection nozzles 14A and 14B.

An intake manifold 15 is connected to the cylinder heads 13A and 13B. Serving as a merging portion, the intake manifold 15 is connected to branch intake passages 16A and 16B. A compressor portion 191A of a supercharger 19A is interposed in the middle of the branch intake passage 16A, and a compressor portion 191B of a supercharger 19B is interposed in the middle of the branch intake passage 16B. The superchargers 19A and 19B are constituted by a well-known variable nozzle type turbocharger actuated by an exhaust gas flow.

The branch intake passages 16A and 16B are connected to a main intake passage 21. The main intake passage 21 is connected to an air cleaner 22. Throttle valves 17A and 17B are provided in the middle of the branch intake passages 16A and 16B between the superchargers 19A and 19B and the intake manifold 15. The throttle valves 17A and 17B are provided for adjusting an intake flow rate drawn into the branch intake passages 16A and 16B via the air cleaner 22 and the main intake passage 21. Opening degree of the throttle valves 17A and 17B are adjusted in accordance with an operation of an accelerator pedal (not shown).

A depression degree of the accelerator pedal is detected by a pedal depression degree detector 26. A rotation angle (a crank angle) of a crank shaft (not shown) is detected by a crank angle detector 27. Depression degree information detected by the pedal depression degree detector 26 and crank angle information detected by the crank angle detector 27 are transmitted to a control computer 28. On the basis of the depression degree information and the crank angle information the control computer 28 calculates and controls a fuel injection period (an injection start timing and an injection end timing) in the fuel injection nozzles 14A and 14B. Further, the control computer 28 calculates an engine speed on the basis of the crank angle information obtained by the crank angle detector 27.

The air drawn into the main intake passage 21 is divided into the branch intake passages 16A and 16B, and the air flowing through the branch intake passages 16A and 16B merges within the intake manifold 15. In other words, the intake air discharged from the compressor portions 191A and 191B of the superchargers 19A and 19B merges within the intake manifold 15 so as to be supplied to the cylinders 12A and 12B. The intake manifold 15, serving as the merging portion, the main intake passage 21 and the branch intake passages 16A and 16B together constitute an intake path.

An exhaust manifold 18A is connected to the cylinder head 13A, and an exhaust manifold 18B is connected to the cylinder head 13B. Exhaust gas generated in the cylinders 12A and 12B is discharged to the exhaust manifolds 18A and 18B. The exhaust manifold 18A is connected to an exhaust passage 20A via a turbine portion 192A of the supercharger 19A. The exhaust manifold 18B is connected to an exhaust passage 20B via a turbine portion 192B of the supercharger 19B. The exhaust passages 20A and 20B correspond to exhaust paths arranged in parallel.

An air flowmeter 23A is arranged within the branch intake passage 16A upstream of the compressor portion 191A of the supercharger 19A. An air flowmeter 23B is arranged within the branch intake passage 16B upstream of the compressor portion 191B of the supercharger 19B. The air flowmeter 23A, serving as an intake flow rate detector, detects an intake flow rate within the branch intake passage 16A, and the air flowmeter 23B, serving as an intake flow rate detector, detects an intake flow rate within the branch intake passage 16B. Information about the intake flow rate detected by the air flowmeter 23A and information about the intake flow rate detected by the air flowmeter 23B are transmitted to the control computer 28.

The branch intake passage 16A on the downstream side of the throttle valve 17A and the exhaust manifold 18A are connected via a first exhaust gas supply passage 24A, and a flow rate adjusting valve 29A is interposed within the first exhaust gas supply passage 24A. The branch intake passage 16B on the downstream side of the throttle valve 17B and the exhaust manifold 18B are connected via a second exhaust gas supply passage 24B, and a flow rate adjusting valve 29B is interposed within the second exhaust gas supply passage 24B. The flow rate adjusting valves 29A and 29B are controlled by the control computer 28.

In cases where the opening degree of the flow rate adjusting valve 29A is not zero, exhaust gas within the exhaust manifold 18A can flow out into the branch intake passage 16A via the first exhaust gas supply passage 24A. In cases where the opening degree of the flow rate adjusting valve 29B is not zero, exhaust gas within the exhaust manifold 18B can flow out into the branch intake passage 16B via the second exhaust gas supply passage 24B. In the present embodiment, the state in which the valve opening degrees are smallest in the flow rate adjusting valves 29A and 29B corresponds to a state in which exhaust gas cannot pass through the flow rate adjusting valves 29A and 29B.

A pressure detector 30 is arranged in the intake manifold 15. The pressure detector 30 detects a pressure (a supercharging pressure) within the intake manifold 15 (downstream of the suction of the superchargers 19A and 19B). Information about the supercharging pressure detected by the pressure detector 30 is transmitted to the control computer 28.

The purifiers 25A and 25B that employ a NOx catalyst are interposed in the exhaust passages 20A and 20B. Addition nozzles 31A and 31B are connected to the exhaust passages 20A and 20B upstream of the purifiers 25A and 25B, and addition nozzles 31A and 31B are connected to pumps 32A and 32B. The pump 32A supplies a reducing agent (for example, fuel of the engine) to the addition nozzle 31A, and the pump 32B supplies the reducing agent to the addition nozzle 31B. Operations of the pumps 32A and 32B are controlled by the control computer 28. The pump 32A and the addition nozzle 31A constitute a reducing agent supplying device that supplies reducing agent to the purifier 25A, and the pump 32B and the addition nozzle 31B constitute a reducing agent supplying device that supplies reducing agent to the purifier 25B.

A temperature detector 33 is provided in the exhaust passage 20A upstream of the purifier 25A. The temperature detector 33 detects a temperature (an exhaust temperature) of exhaust gas flowing within the exhaust passage 20A. Information about the exhaust temperature detected by the temperature detector 33 is transmitted to the control computer 28.

An oxygen concentration detector 34 is provided in the exhaust passage 20A downstream of the purifier 25A. The oxygen concentration detector 34 detects concentrations of oxygen in the exhaust gas flowing within the exhaust passage 20A. Information about concentrations of oxygen detected by the oxygen concentration detector 34 is transmitted to the control computer 28. On the basis of the history of concentrations of oxygen and the exhaust temperature the control computer 28 calculates an amount of NOx absorbed in the purifier 25A.

Figure 2:
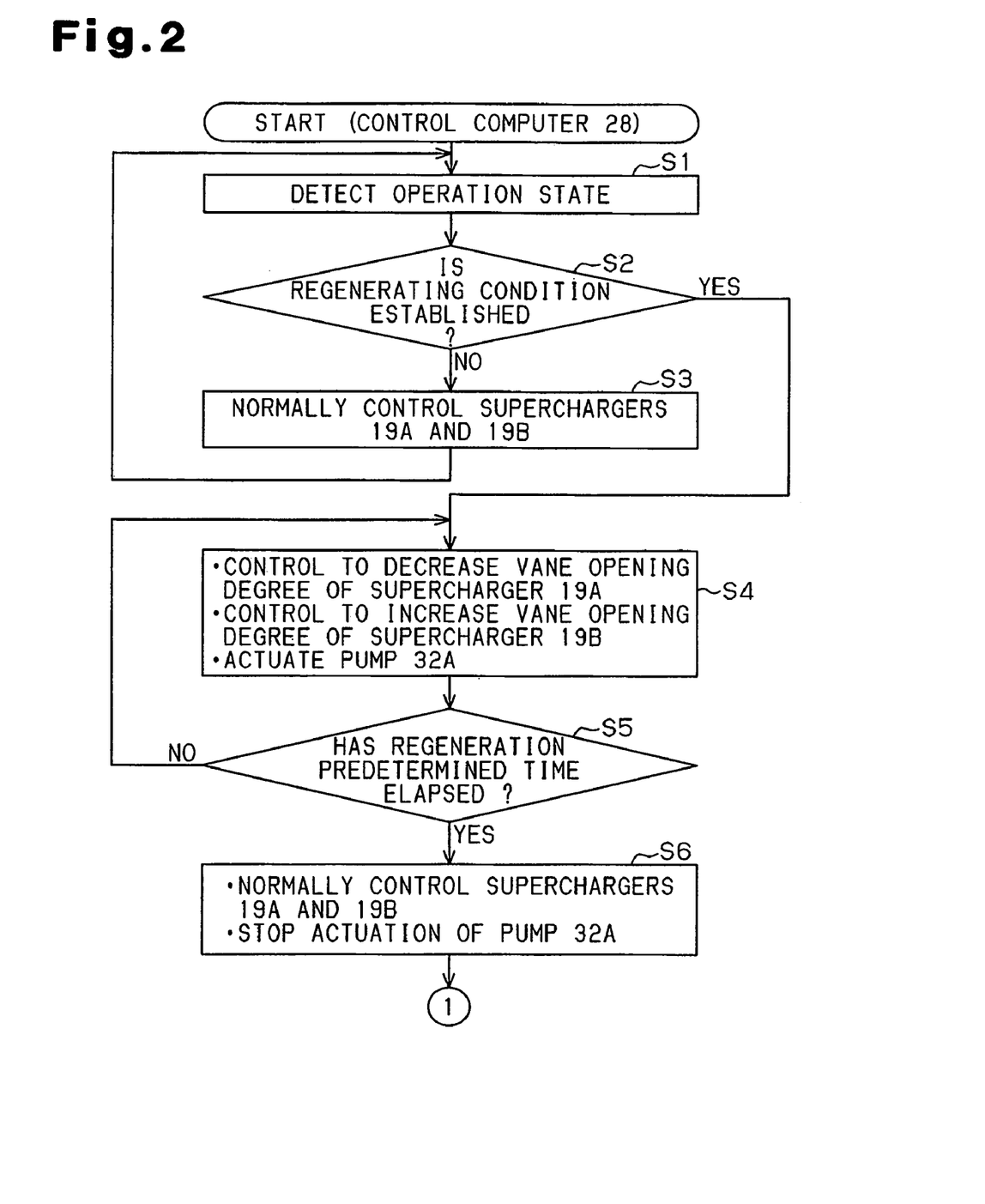
FIG. 2 is a flowchart illustrating a regeneration control procedure in accordance with the first embodiment.
Figure 3:
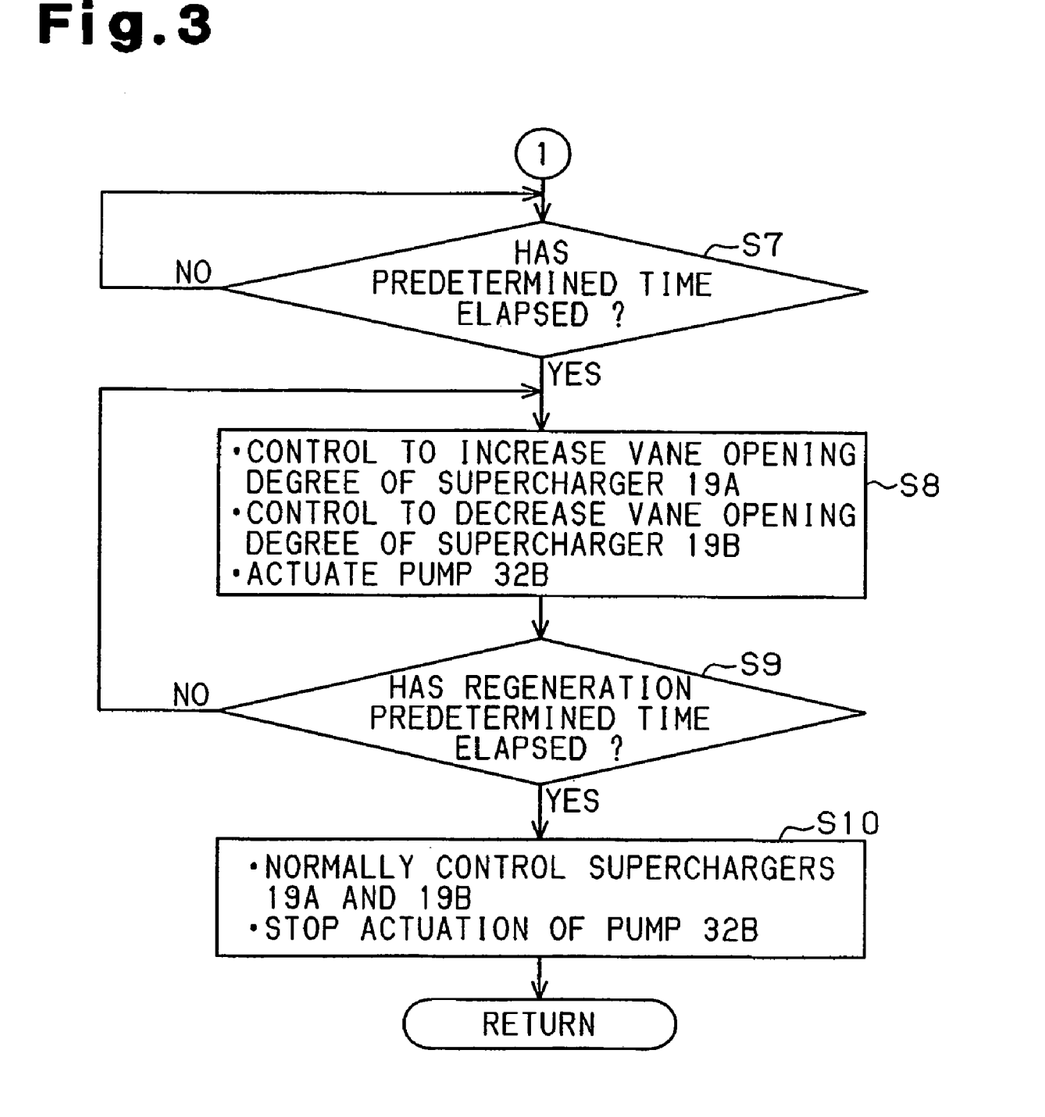
FIG. 3 is a flowchart illustrating a continuation of the regeneration control procedure in FIG. 2.

On the basis of a regeneration control program illustrated by a flowchart in FIGS. 2 and 3 the control computer 28 controls vane opening degrees in the turbine portions 192A and 192B of the superchargers 19A and 19B. A description will be given below of regeneration control on the basis of the flowchart in FIGS. 2 and 3.

The control computer 28 detects an operating state of the internal combustion engine 10 (step S1). The operating state of the internal combustion engine 10 can be expressed by factors such as information about intake flow rate obtained by the air flowmeters 23A and 23B, depression degree information obtained by the pedal depression degree detector 26, an engine speed, information about exhaust temperature obtained by the temperature detector 33 and information about concentrations of oxygen obtained from the oxygen concentration detector 34.

On the basis of the operating state detected, the control computer 28 judges whether or not a condition for regenerating the purifiers 25A and 25B has been established (step S2). The regeneration condition is deemed to have been established in cases where all of the following three conditions have been met.

(1) Circumstances where, on the basis of the relation between the engine speed and the depression degree, it is judged that an operating state is suitable for adding reducing agent (where the engine speed and the depression degree exist in a region in which torque shock is unlikely to be generated by adding reducing agent).

(2) Circumstances where the exhaust temperature reaches a predetermined temperature (a temperature at which the NOx catalyst can be deemed to have been sufficiently activated).

(3) Circumstances in which the absorbed amount of NOx in the purifier 25A reaches a predetermined level.

In cases where the regeneration conditions are not met (NO in the step S2), the control computer 28 executes a normal control with respect to the superchargers 19A and 19B (step S3).

With respect to the superchargers 19A and 19B, normal control means the following. On the basis of factors such as the engine speed and the engine load the control computer 28 determines a target supercharging pressure from a map previously set. The control computer 28 determines the engine speed from the time of a change in the crank angle detected by the crank angle detector 27. Further, the control computer 28 determines the engine load, for example, from the fuel injection period (the fuel injection amount). Further, the control computer 28 controls vane opening degrees in the turbine portions 192A and 192B of the superchargers 19A and 19B in such a manner that the supercharging pressure detected by the pressure detector 30 reaches the target supercharging pressure.

In the case of normal control, the vane opening degrees in the superchargers 19A and 19B do not reach the minimum state (zero opening degree), and exhaust gas is discharged from both exhaust passages 20A and 20B. In this case, a discharge flow rate of exhaust gas in the exhaust passage 20A is equal to the discharge flow rate of exhaust gas in the exhaust passage 20B.

After processing of step 3, the control computer 28 proceeds to the process in step 1.

In cases where the regeneration condition has been established (YES in step S2), the control computer 28 proceeds to step S4. The control in step S4 corresponds to a compensating control of increasing the vane opening degree in the supercharger 19B to above what is normal as well as reducing the vane opening degree in the supercharger 19A to less than what is normal. Further, in the control in step S4, a control is executed of actuating the pump 32A so as to inject the reducing agent from the addition nozzle 31A into the exhaust passage 20A. The reducing agent injected from the addition nozzle 31A discharges from the catalyst the NOx absorbed into the catalyst within the purifier 25A so as to regenerate the purifier 25A.

The compensation control for reducing the vane opening degree in the supercharger 19A corresponds to a control of reducing the flow rate of exhaust gas discharged from the exhaust passage 20A to the outside, and increasing the supply rate of exhaust gas flowing to the branch intake passage 16A via the first exhaust gas supply passage 24A. The compensation control of increasing the vane opening degree in the supercharger 19B corresponds to a control of increasing the flow rate of exhaust gas discharged from the exhaust passage 20B to the outside, and reducing the supply flow rate of exhaust gas flowing to the branch intake passage 16B via the second exhaust gas supply passage 24B.

Figure 1B:
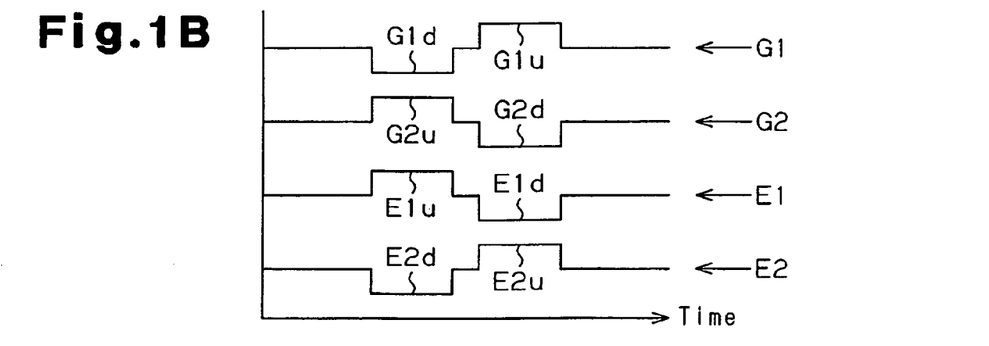
FIG. 1B is a graph illustrating changes in discharge flow rate of exhaust gas and in a supply flow rate of the exhaust gas.

FIG. 1B is a graph showing changes in the discharge flow rate of exhaust gas and the supply flow rate of exhaust gas. Line G1 on the graph shows the change in the flow rate of exhaust gas discharged from the exhaust passage 20A to the outside, and line G2 shows the change in the flow rate of exhaust gas discharged from the exhaust passage 20B to the outside. Section $G1d$ shows a state in which the flow rate of exhaust gas discharged from the exhaust passage 20A to the outside is reduced in relation to the regeneration of the purifier 25A. Section $G2u$ shows a state in which the flow rate of exhaust gas discharged from the exhaust passage 20B to the outside is increased in relation to the regeneration of the purifier 25A.

Line E1 on the graph in FIG. 1B shows changes in the supply flow rate of the exhaust gas flowing to the branch intake passage 16A via the first exhaust gas supply passage 24A, and line E2 shows changes in the supply flow rate of the exhaust gas flowing to the branch intake passage 16B via the second exhaust gas supply passage 24B. Section $E1u$ shows a state in which the supply flow rate of exhaust gas flowing to the branch intake passage 16A via the first exhaust gas supply passage 24A is increased in relation to the regeneration of the purifier 25A. Section $E2d$ shows a state in which the supply flow rate of exhaust gas flowing to the branch intake passage 16B via the second exhaust gas supply passage 24B is reduced in relation to the regeneration of the purifier 25A.

The amount of increase in the supply flow rate of exhaust gas flowing to the branch intake passage 16A via the first exhaust gas supply passage 24A, and the amount of decrease in the flow rate of exhaust gas discharged from the exhaust passage 20A to the outside are constant from the start of regeneration to the completion of regeneration. In the same manner, the amount of decrease in the supply flow rate of exhaust gas flowing to the branch intake passage 16B via the second exhaust gas supply passage 24B, and the amount of increase in the discharge flow rate of exhaust gas discharged from the exhaust passage 20B to the outside are constant from the start of regeneration to the completion of regeneration.

The amount of increase in the supply flow rate of exhaust gas flowing to the branch intake passage 16A via the first exhaust gas supply passage 24A is equal to the amount of decrease in the flow rate of exhaust gas discharged from the exhaust passage 20A to the outside. Further, the amount of decrease in the supply flow rate of the exhaust gas flowing to the branch intake passage 16B via the second exhaust gas supply passage 24B is equal to the amount of increase in the flow rate of exhaust gas discharged from the exhaust passage 20B to the outside. Further, the amount of increase in the supply flow rate of exhaust gas flowing to the branch intake passage 16A via the first exhaust gas supply passage 24A is equal to the amount of decrease in the supply flow rate of exhaust gas flowing to the branch intake passage 16B via the second exhaust gas supply passage 24B. In other words, the control computer 28 controls so as to increase and decrease the vane opening degrees of the superchargers 19A and 19B in such a manner that the supply flow rate of exhaust gas flowing to the intake manifold via the exhaust gas supply passages 24A and 24B does not change either before regeneration or during regeneration.

The control computer 28 judges whether or not the time of control that has elapsed in step S4 has reached a regeneration predetermined time set in advance (step S5). In cases where the time of control that has elapsed in step S4 reaches the regeneration predetermined time set in advance (YES in step S5), the control computer 28 returns the control of the superchargers 19A and 19B to normal control, and executes control so as to stop the operation of the pump 32A (step S6). If the operation of the pump 32A is stopped, the injection of reducing agent from the addition nozzle 31A is stopped.

The control computer 28 judges whether or not the time of control that has elapsed in step S6 has reached a predetermined time set in advance (step S7). In cases where the predetermined time has passed after the control in step S6 has been executed (YES in step S7), the control computer 28 proceeds to step S8. The control in step S8 corresponds to a compensation control for reducing the vane opening degree in the supercharger 19B to a level lower than normal, and increasing the vane opening degree in the supercharger 19A to a level higher than normal. Further, in the control in step S8, a control is carried out for injecting reducing agent from the addition nozzle 31B into the exhaust passage 20B by actuating the pump 32B. The reducing agent injected from the addition nozzle 31B discharges from the catalyst the NOx absorbed in the catalyst within the purifier 25B so as to regenerate the purifier 25B.

The control for decreasing the vane opening degree in the supercharger 19B corresponds to the control for decreasing the discharge flow rate of the exhaust gas discharged from the exhaust passage 20B to the outside and increasing the supply flow rate of the exhaust gas flowing to the branch intake passage 16B via the second exhaust gas supply passage 24B. The control for increasing the vane opening degree in the supercharger 19A corresponds to the control for increasing the discharge flow rate of the exhaust gas discharged from the exhaust passage 20A to the outside and decreasing the supply flow rate of the exhaust gas flowing to the branch intake passage 16A via the first exhaust gas supply passage 24A.

Section G1$u$ on the graph in FIG. 1B illustrates a state in which the low rate of the exhaust gas discharged from the exhaust passage 20A to the outside is increased in relation to the regeneration of the purifier 25B. Section G2$d$ shows a state in which the flow rate of exhaust gas discharged from the exhaust passage 20B to the outside is decreased in relation to the regeneration of the purifier 25B.

Section E1$d$ on the graph in FIG. 1B illustrates a state in which the supply flow rate of the exhaust gas flowing to the branch intake passage 16A via the first exhaust gas supply passage 24A is decreased in relation to the regeneration of the purifier 25B. Section E2$u$ illustrates a state in which the supply flow rate of exhaust gas flowing to the branch intake passage 16B via the second exhaust gas supply passage 24B is increased in relation to the regeneration of the purifier 25B.

The amount of increase in the supply flow rate of the exhaust gas flowing to the branch intake passage 16B via the second exhaust gas supply passage 24B, and the amount of decrease in the flow rate of the exhaust gas discharged from the exhaust passage 20B to the outside are constant between the start of regeneration and the completion of regeneration. In the same manner, the amount of decrease in the supply flow rate of the exhaust gas flowing to the branch intake passage 16A via the first exhaust gas supply passage 24A, and the amount of increase in the exhaust gas flow rate discharged from the exhaust passage 20A to the outside are constant between the start of regeneration and the completion of regeneration.

The amount of increase in the supply flow rate of exhaust gas flowing to the branch intake passage 16B via the second exhaust gas supply passage 24B is equal to the amount of decrease in the discharge flow rate of exhaust gas discharged from the exhaust passage 20B to the outside. Further, the amount of decrease in the supply flow rate flowing to the branch intake passage 16A via the first exhaust gas supply passage 24A is equal to the amount of increase in the discharge flow rate of exhaust gas discharged from the exhaust passage 20A to the outside. Further, the amount of increase in the supply flow rate of exhaust gas flowing to the branch intake passage 16B via the second exhaust gas supply passage 24B is equal to the amount of decrease in the supply flow rate of exhaust gas flowing into the branch intake passage 16A via the first exhaust gas supply passage 24A. In other words, the control computer 28 controls so as to increase and decrease the vane opening degrees of the superchargers 19A and 19B in such a manner that the supply flow rate of exhaust gas flowing to the intake manifold 15 via the exhaust gas supply passages 24A and 24B does not change between before regeneration of the purifier 25A and during regeneration of the purifier 25A.

The control computer 28 judges whether or not the time of control elapsed in step S8 has reached a regeneration predetermined time set in advance (step S9). In cases where the time of control elapsed in step S8 has reached the regeneration predetermined time set in advance (YES in step S9), the control computer 28 carries out control for restoring control of the superchargers 19A and 19B to normal control, and for stopping the operation of the pump 32B (step S10). When the operation of the pump 32B has stopped, the injection of reducing agent from the addition nozzle 31B is also terminated.

After the process in step S10, the control computer 28 proceeds to the process in step S1.

The first exhaust gas supply passage 24A is an exhaust gas supply path for supplying exhaust gas to the intake path from the exhaust manifold 18A constituting the first exhaust path. The second exhaust gas supply passage 24B is an exhaust gas supply path for supplying exhaust gas to the intake path from the exhaust manifold 18B constituting the second exhaust path. The turbine portion 192A of the supercharger 19A corresponds to a flow rate adjuster, and functions as a discharge flow rate adjuster that adjusts the discharge flow rate of exhaust gas discharged from the first exhaust path and as a supply flow rate adjuster that adjusts the flow rate of exhaust gas supplied to the intake path from the first exhaust path via the exhaust gas supply path. The turbine portion 192B of the supercharger 19B corresponds to a flow rate adjuster, and functions as a discharge flow rate adjuster that adjusts the discharge flow rate of the exhaust gas discharged from the second exhaust path and as a supply flow rate adjuster that adjusts the flow rate of exhaust gas supplied to the intake path from the second exhaust path via the exhaust gas supply path.

The control computer 28 corresponds to a control section that controls the flow rate in a plurality of flow rate adjusters. In this case the flow rate adjusting state in the flow rate adjuster corresponds to an adjusting state of a magnitude of the vane opening degree in the turbine portions 192A and 192B.

The following advantages can be obtained in the first embodiment.

(1-1) When the purifier 25A is regenerated, the regeneration of the purifier 25B is not executed, the exhaust gas supply flow rate in the first exhaust gas supply passage 24A on the side of the purifier 25A which is regenerated is increased, and the exhaust gas supply flow rate in the second exhaust gas supply passage 24B on the side of the purifier 25B which is not regenerated is decreased. When the purifier 25B is regenerated, the regeneration of the purifier 25A is not executed, the exhaust gas supply flow rate in the second exhaust gas supply passage 24B on the side of the purifier 25B which is regenerated is increased, and the exhaust gas supply flow rate in the first exhaust gas supply passage 24A on the side of the purifier 25A which is not regenerated is decreased. In other words, the regeneration of the purifier 25A or the purifier 25B is executed while suppressing the fluctuation of the supply flow rate of exhaust gas supplied to the intake manifold 15 (the intake path shared by the cylinder 12A group and the cylinder 12B group) from the exhaust manifolds 18A and 18B (a part of the exhaust path). In other words, the regeneration of purifiers 25A and 25B is executed in such a manner that the exhaust gas supply flow rate from the exhaust path to the intake path does not largely change between immediately before the start of regeneration and immediately after the start of regeneration. In relation to the regeneration of the purifiers 25A and 25B described above, the amount of NOx generated at the time the purifiers 25A and 25B are generated is not increased.

(1-2) When the purifier 25A is regenerated, the exhaust gas supply flow rate in the first exhaust gas supply passage 24A is increased, and the exhaust gas supply flow rate in the second exhaust gas supply passage 24B on the side of the purifier 25B which is not regenerated is decreased by the amount of increase in the exhaust gas supply flow rate in the first exhaust gas supply passage 24A. When the purifier 25B is regenerated, the exhaust gas supply flow rate in the second exhaust gas supply passage 24B is increased, and the exhaust gas supply flow rate in the first exhaust gas supply passage 24A on the side of the purifier 25A which is not regenerated is decreased by the amount of increase in exhaust gas supply flow rate in the second exhaust gas supply passage 24B. In the context of the control of aligning the amount of increase with the amount of decrease, fluctuations in the supply flow rate of the exhaust gas supplied to the intake path from the exhaust path hardly occur.

(1-3) When regeneration of the purifier 25A or the purifier 25B has been completed, the compensation control for increasing the exhaust gas supply flow rate in any one of the first exhaust gas supply passage 24A and the second exhaust gas supply passage 24B, and for decreasing the exhaust gas supply flow rate in the other is eliminated. The time required for regeneration in the purifiers 25A and 25B with the use of the NOx catalyst is short, such as about one second, and it is possible to assume that the fluctuations in the engine speed before and after regeneration are small. In other words, it can be assumed that the exhaust gas supply flow rate from the exhaust path to the intake path does not fluctuate largely between immediately before the start of regeneration and immediately after the start of regeneration. Accordingly, even when the exhaust gas supply flow rate from the exhaust path to the intake path is made equal between immediately before the start of regeneration and during the regeneration, the amount of NOx generated is not increased at the time the purifiers 25A and 25B are regenerated.

In the present embodiment, in the case of regenerating the purifier 25A, the amount of increase in the supply rate of exhaust gas flowing to the branch intake passage 16A via the first exhaust gas supply passage 24A, and the amount of decrease in the flow rate discharged from the exhaust passage 20A to the outside are constant from the start of regeneration to the completion of regeneration. In the same manner, the amount of decrease in the supply flow rate of exhaust gas flowing to the branch intake passage 16B via the second exhaust gas supply passage 24B, and the amount of increase in the exhaust gas flow rate discharged from the exhaust passage 20B to the outside are constant from the start of regeneration to the completion of regeneration. Further, in the case of regenerating the purifier 25B, the amount of increase in the supply flow rate of exhaust gas flowing to the branch intake passage 16B via the second exhaust gas supply passage 24B, and the amount of decrease in the discharge flow rate of exhaust gas discharged from the exhaust passage 20B to the outside are constant from the start of regeneration to the completion of regeneration. In the same manner, the amount of decrease in the supply flow rate of exhaust gas flowing to the branch intake passage 16A via the first exhaust gas supply passage 24A, and the amount of increase in the exhaust gas flow rate discharged from the exhaust passage 20A to the outside are fixed between the start of regeneration and the completion of regeneration.

In other words, the exhaust gas supply flow rate from the exhaust path to the intake path during regeneration is set at the same constant flow rate as the exhaust gas supply flow rate immediately before the start of regeneration. In the present embodiment in which the total amount of exhaust gas supply flow rate from the exhaust path to the intake path during regeneration is constant (at the same level as the exhaust gas supply flow rate immediately before the start of regeneration), control is easy for purposes of regeneration.

(1-4) When the purifier 25A is regenerated, the discharge flow rate of exhaust gas in the exhaust passage 20A is decreased, and the discharge flow rate of exhaust gas in the exhaust passage 20B in the purifier 25B, which is not regenerated, is increased by the amount of the decrease in the discharge flow rate of the exhaust gas in the exhaust passage 20A. When the purifier 25B is regenerated, the discharge flow rate of exhaust gas in the exhaust passage 20B is decreased, the discharge flow rate of exhaust gas in the exhaust passage 20A on the side of the purifier 25A which is not regenerated, is increased by the amount of the decrease in the discharge flow rate of exhaust gas in the exhaust passage 20B. In the course of control in which the amount of increase is equalized with the amount of decrease as mentioned above, fluctuations in the total extent of discharge flow rate of the exhaust gas to the outside from the exhaust path are hardly generated. Accordingly, the intake flow rate hardly fluctuates between immediately before the start of regeneration and immediately after the start of regeneration, and torque shock is hardly generated.

(1-5) In order to detect independently in the purifiers 25A and 25B whether or not conditions for regenerating the purifiers 25A and 25B have been established, it is necessary to arrange a temperature detector in each of the exhaust passages 20A and 20B. In the present embodiment, since a structure is made such that purifier 25B is subsequently regenerated in cases where it is necessary to regenerate the purifier 25A, it is not necessary to arrange a temperature detector for detecting whether or not conditions for regenerating the purifier 25B have been established in the exhaust passage 20B. In other words, since the system detects whether or not conditions for regenerating the purifier 25A have been established, and does not detect whether or not conditions for regenerating the purifier 25B have been established, the system for controlling regeneration in the present embodiment becomes simpler in comparison with a case in which the establishment of conditions for regenerating purifiers 25A and 25B are detected individually.

(1-6) In the present embodiment, by increasing and decreasing vane opening degrees in the turbine portions 192A and 192B of the superchargers 19A and 19B, it is possible to increase and decrease the discharge flow rate of exhaust gas from the exhaust passages 20A and 20B. In the internal combustion engine additionally provided with the superchargers 19A and 19B, a new mechanism for increasing and decreasing the discharge flow rate of exhaust gas from the exhaust passage 20A and 20B is not necessary. Accordingly, in the internal combustion engine designed such as to be additionally provided with the superchargers 19A and 19B, it is possible to enhance the regenerating efficiency of a pair of purifiers 25A and 25B (to reduce the amount of reducing agent), without adding any new mechanism for increasing and decreasing the discharge flow rate of the exhaust gas from the exhaust passages 20A and 20B.

Figure 4:
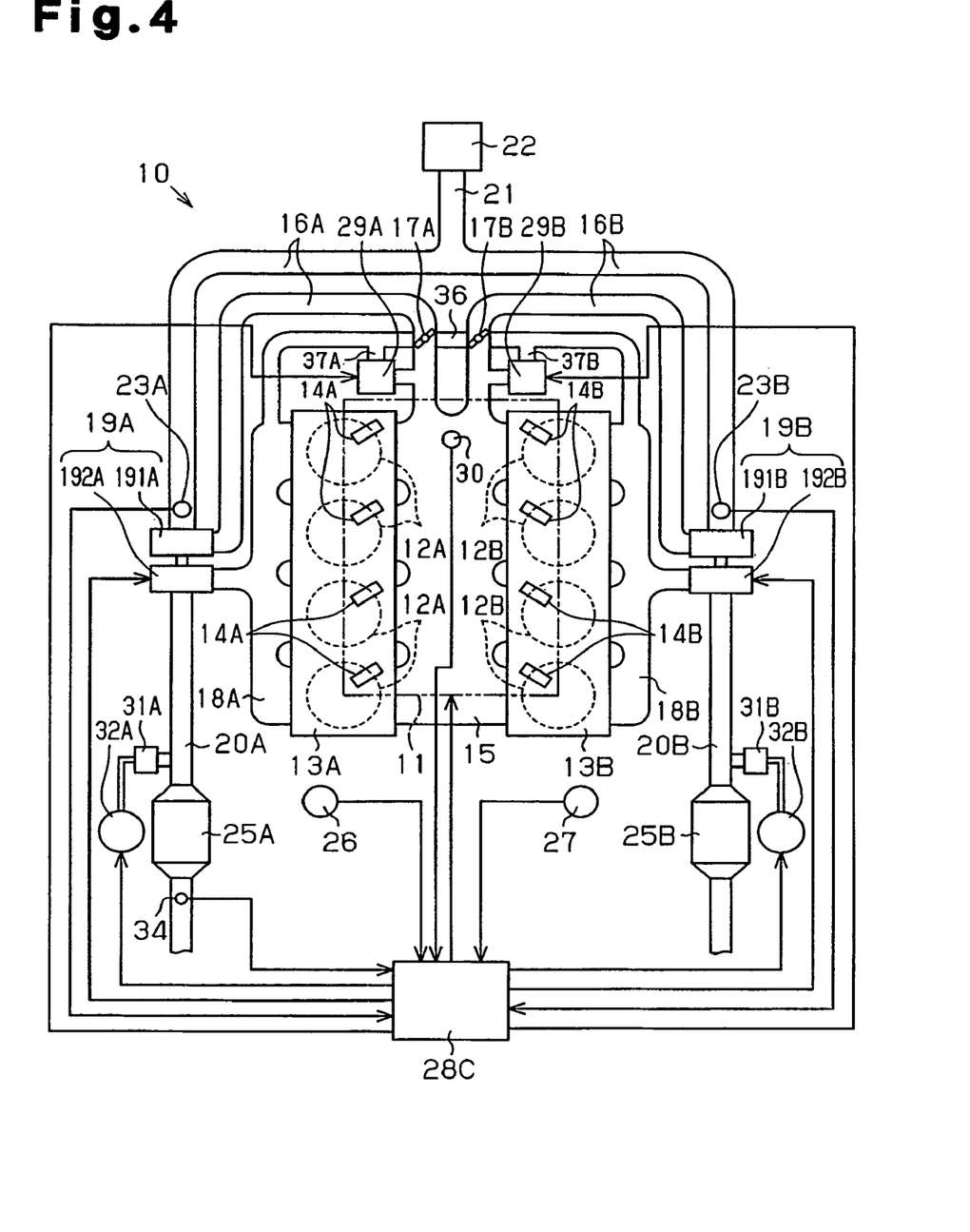
FIG. 4 is an overall view showing an exhaust gas purifying apparatus in accordance with a second embodiment of the present invention.

Next, a description will be given of a second embodiment in FIG. 4. The same reference numerals are given to the same constituting portions as those in the first embodiment.

In the second embodiment, the exhaust manifolds 18A and 18B are connected by a communication passage 36. The communication passage 36 and the branch intake passage 16A are connected by a branch passage 37A, and a flow rate adjusting valve 29A is interposed in the branch passage 37A. The communication passage 36 and the branch intake passage 16B are connected by a branch passage 37B, and a flow rate adjusting valve 29B is interposed in the branch passage 37B. The communication passage 36 contributes to suppression of generation of pulsation in cases where exhaust gas is supplied to the single intake manifold 15 from a pair of exhaust manifolds 18A and 18B, and to elimination of uneven distribution. In the second embodiment, the temperature detector 33 provided in the first embodiment is not used.

A regeneration control program in the second embodiment is different from the first embodiment only insofar that in place of steps S1 and S2 in the regeneration control program according to the first embodiment steps S11 and S12 described below are executed. The following description will be given only of a different step S11, and an illustration of a flowchart showing the regeneration control program is omitted.

A control computer 28C detects the operating state of the internal combustion engine 10 (step S11). The operating state of the internal combustion engine 10 can be expressed by factors such as the intake amount information obtained from the air flowmeters 23A and 23B, depression degree information obtained from the pedal depression degree detector 26, the engine speed, estimated exhaust gas temperature information, and information about concentrations of oxygen obtained from the oxygen concentration detector 34. On the basis of factors such as information on the calculated engine speed, information on the fuel injection period, information on the intake flow rate obtained by the air flowmeters 23A and 23B, the control computer 28C estimates the exhaust gas temperature in the exhaust passages 20A and 20B. Further, on the basis of the history of oxygen concentration and the estimated exhaust gas temperature the control computer 28C calculates the amount of NOx absorbed in the purifier 25A.

On the basis of the operating state detected the control computer 28C judges whether or not conditions for regenerating the purifiers 25A and 25B have been established (step S12). regenerating conditions are deemed to have been established in cases where the following three conditions have all been established.

(4) Circumstances in which on the basis of the relation between the engine speed and the depression degree it is judged that the operating state is suitable for adding the reducing agent (the engine speed and the depression degree exist in an area where torque shock is unlikely to be generated by the addition of reducing agent).

(5) Circumstances in which the estimated exhaust gas temperature reaches a predetermined temperature (the temperature at which the NOx catalyst can be assumed to have been sufficiently activated).

(6) Circumstances in which the amount of NOx absorbed in the purifier 25A reaches a predetermined level.

The control computer 28C corresponds to a control section for controlling the flow rate adjusting state in a plurality of flow rate adjusters.

In the second embodiment, it is possible to obtain the same advantages as in items (1-1) to (1-6) described in the first embodiment.

Figure 5:
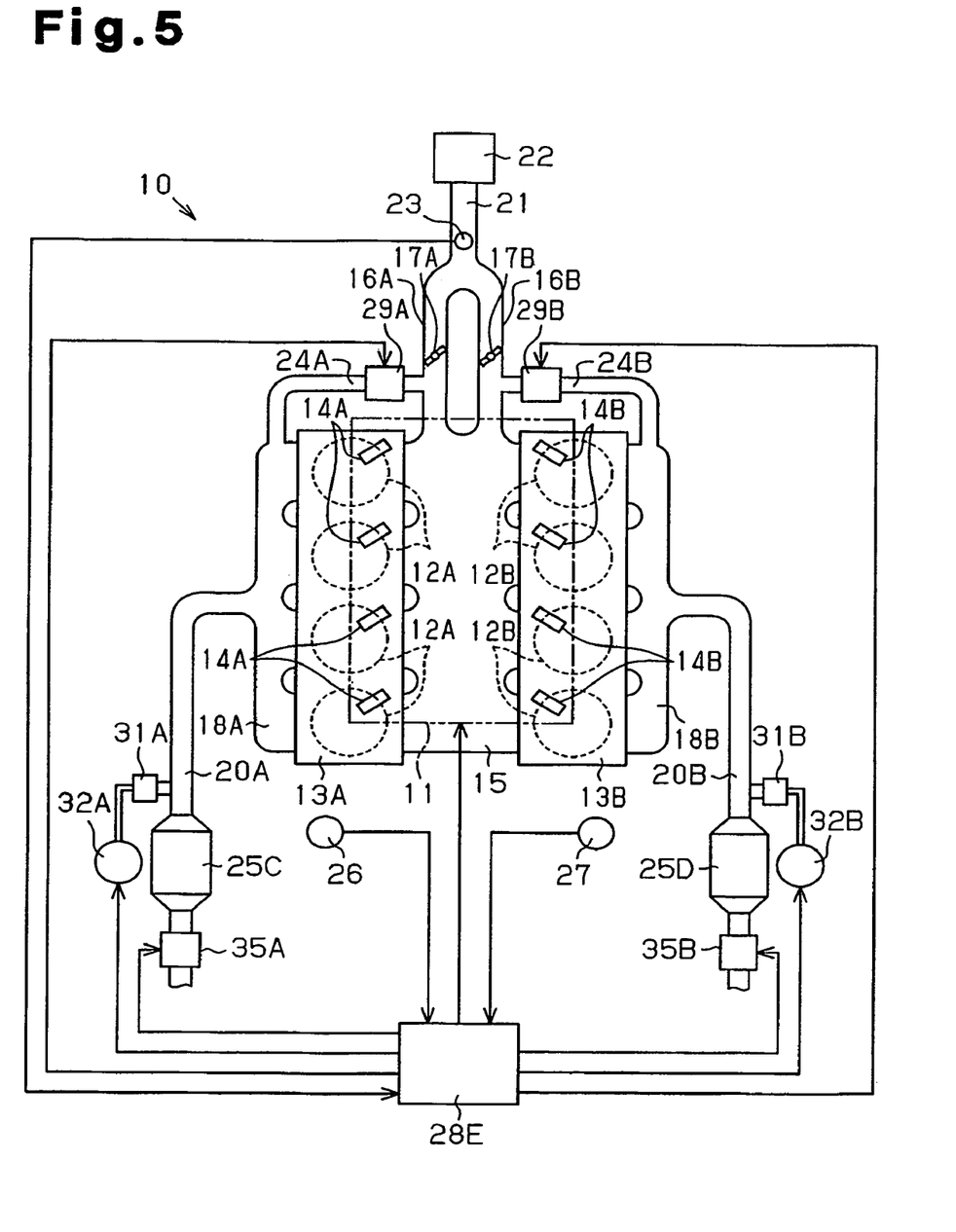
FIG. 5 is an overall view showing an exhaust gas purifying apparatus in accordance with a third embodiment of the present invention.

Next, a description will be given of a third embodiment in FIGS. 5 to 7. The reference numerals are used in the same constituting portions as those of the first embodiment.

The third embodiment is different from the first embodiment insofar that a supercharger is not additionally provided, and the exhaust throttle valves 35A and 35B are provided in the exhaust passages 20A and 20B downstream of the purifiers 25C and 25D. Further, in the third embodiment, the purifiers 25C and 25D are used for collecting black smoke particles. The temperature detector and the oxygen concentration detector are not used. A single air flowmeter 23 is provided in the main intake passage 21.

A control computer 28E in the third embodiment controls valve opening degrees in the exhaust throttle valves 35A and 35B, and valve opening degrees in the flow rate adjusting valves 29A and 29B. The control computer 28E controls the valve opening degrees of the exhaust throttle valves 35A and 35B, for example, on the basis of brake pedal operation information obtained from a sensor for detecting the depression of a brake pedal (not shown).

Figure 6:
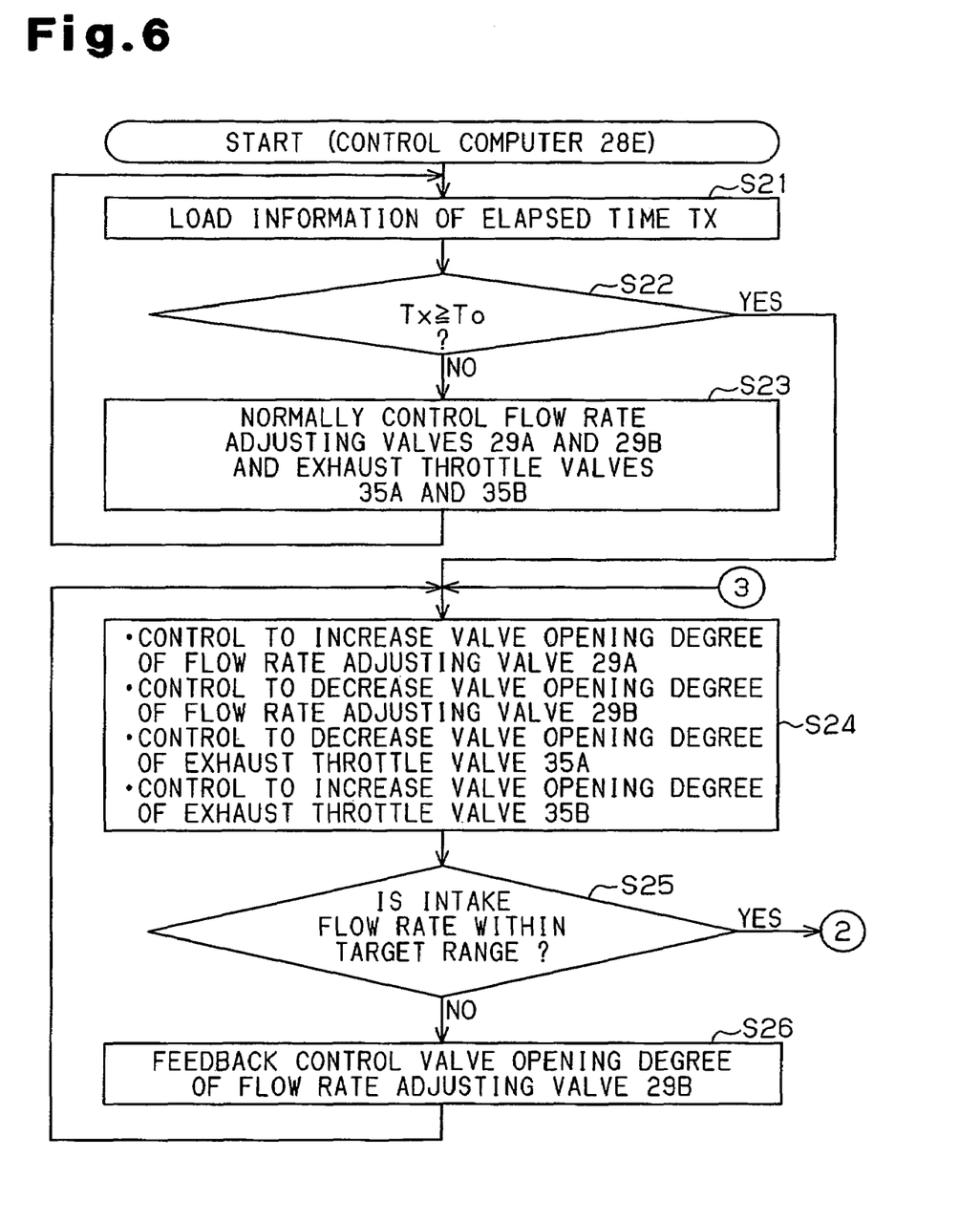
FIG. 6 is a flowchart illustrating a regeneration control procedure in accordance with the third embodiment.
Figure 7:
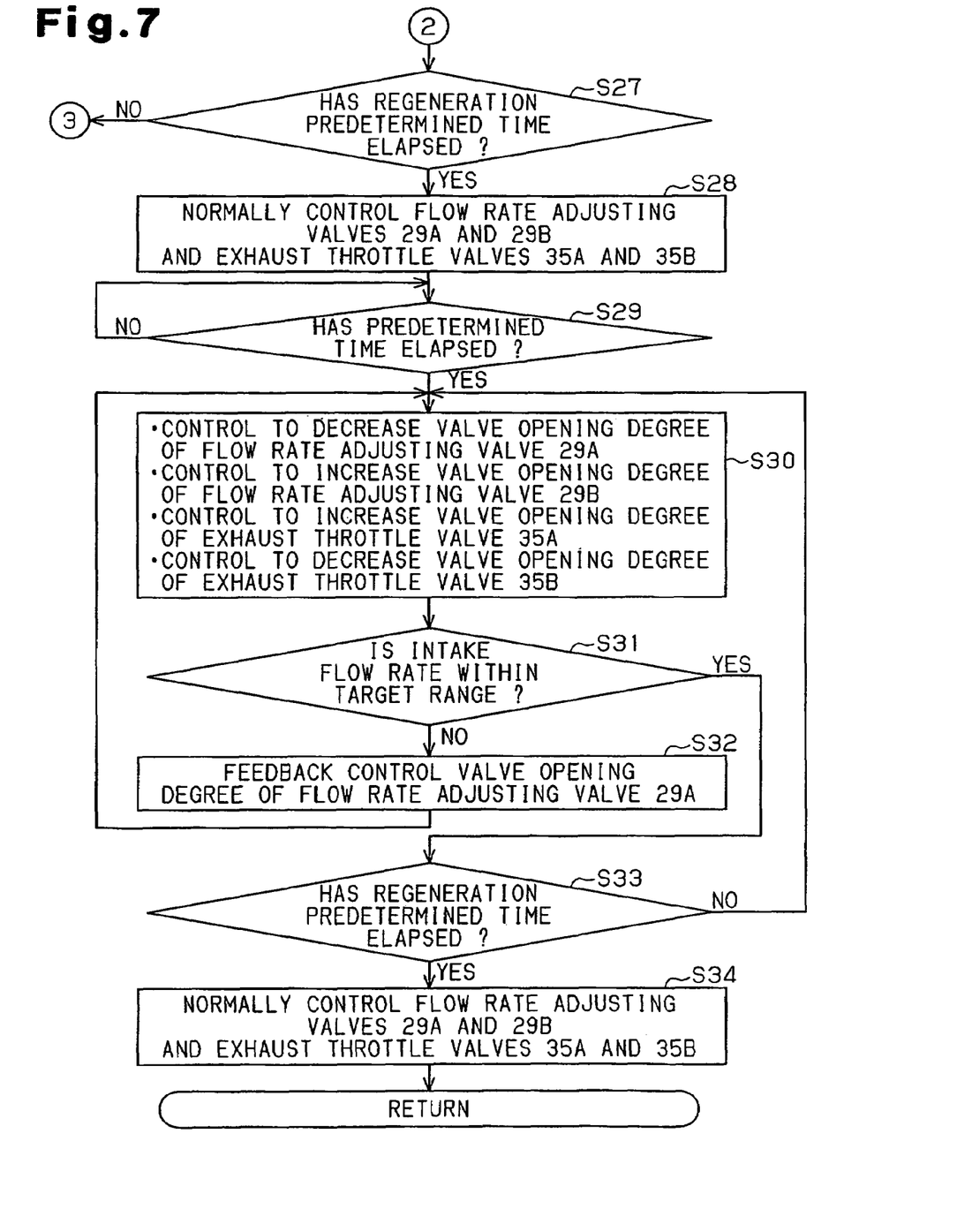
FIG. 7 is a flowchart illustrating a continuation of the regeneration control procedure in FIG. 6.

The control computer 28E executes the regeneration control program illustrated by flowcharts in FIGS. 6 and 7. A description will be given below of regeneration control on the basis of the flowcharts in FIGS. 6 and 7.

In cases where it has not executed regeneration, the control computer 28E loads an elapsed time Tx from an initial moving time of the engine in a predetermined control cycle and in cases where regeneration has already been executed, loads an elapsed time Tx from an end time of the preceding regeneration in a predetermined control cycle (step S21). The control computer 28E then compares whether the elapsed time Tx that has been loaded or a reference time T0 that has been previously set is larger (step S22). In cases where the elapsed time Tx is less than the reference time To (NO in the step S22), the control computer 28E executes normal control with regard to the exhaust throttle valves 35A and 35B, and to the flow rate adjusting valves 29A and 29B (step S23).

In cases of NO in step S22 (in cases where regenerating conditions have not been established), the control computer 28E executes normal control with regard to the exhaust throttle valves 35A and 35B and the flow rate adjusting valves 29A and 29B (step S23).

Normal control with regard to the exhaust throttle valves 35A and 35B corresponds to the following control. If a depressing operation of the brake pedal is executed, the control computer 28E executes control for reducing the degree of openings of the exhaust throttle valves 35A and 35B. Accordingly, exhaust gas resistance in the exhaust passages 20A and 20B is increased, and the exhaust gas resistance increases the engine load so that it is applied as a braking operation to the vehicle.

Normal control with regard to the flow rate adjusting valves 29A and 29B corresponds to the following control. The control computer 28 controlling the opening degrees of the flow rate adjusting valves 29A and 29B determines the necessary intake flow rate from the fuel injection period (the fuel injection amount) mentioned above, and further determines a target supply rate=(exhaust gas supply flow rate)/[(exhaust gas supply flow rate)+(intake flow rate)]. The control computer 28 calculates the opening degree of the flow rate adjusting valves 29A and 29B by using information about the intake flow rate detected by the air flowmeters 23A and 23B in such a manner that a target supply rate can be obtained. Further, the control computer 28 controls in such a manner that the opening degree in the flow rate adjusting valves 29A and 29B accords with a valve opening degree that has been calculated. In cases where the valve opening degree in the flow rate adjusting valves 29A and 29B is not zero, a part of the exhaust gas within the exhaust manifolds 18A and 18B is transmitted to the intake manifold 15 via the exhaust gas supply passages 24A and 24B. Accordingly, the combustion temperature within the combustion chamber in the cylinders 12A and 12B is lowered, and generation of NOx is decreased.

In normal control over the exhaust throttle valves 35A and 35B, the valve opening degree of the exhaust throttle valves 35A and 35B does not correspond to the zero opening degree, but exhaust gas is discharged from both exhaust passages 20A and 20B. In this case, the discharge flow rate of exhaust gas in the exhaust passage 20A is equal to the discharge flow rate of exhaust gas in the exhaust passage 20B.

In the case of YES in step S22 (in cases where regenerating conditions have been established), the control computer 28E proceeds to step S24. The control in the step S24 corresponds to the compensation control of increasing the valve opening degree in the exhaust throttle valve 35B as well as lowering the valve opening degree in the exhaust throttle valve 35A, and lowering the valve opening degree of the flow rate adjusting valve 29B as well as increasing the valve opening degree of the flow rate adjusting valve 29A. The discharge flow rate in the exhaust passage 20A is decreased by lowering the valve opening degree in the exhaust throttle valve 35A, and the exhaust gas temperature in the exhaust passage 20A is increased. The valve opening degree of the exhaust throttle valve 35A after the valve opening degree has been lowered (the exhaust flow rate in the exhaust passage 20A after the valve opening degree has been lowered) is set such that the exhaust gas temperature in the exhaust passage 20A reaches a the suitable temperature for burning out black smoke particles collected in the purifier 25C.

The amount of increase in the supply flow rate of exhaust gas flowing to the branch intake passage 16A via the first exhaust gas supply passage 24A is equal to the amount of decrease in the discharge flow rate of the exhaust gas discharged from the exhaust passage 20A to the outside. Further, the initial value of the amount of decrease in the supply flow rate of the exhaust gas flowing to the branch intake passage 16B via the second exhaust gas supply passage, 24B is equal to the initial value of the amount of increase in the discharge flow rate of the exhaust gas discharged from the exhaust passage 20B to the outside. Further, the amount of increase in the supply flow rate of exhaust gas flowing to the branch intake passage 16A via the first exhaust gas supply passage 24A is equal to the initial value of the amount of decrease in the supply flow rate of exhaust gas flowing to the branch intake passage 16B via the second exhaust gas supply passage 24B.

The control computer 28E judges whether or not the intake flow rate detected by the air flowmeter 23 is within the target range (step S25). The target range of the intake flow rate is determined from a map previously set on the basis of factors such as the engine speed and the engine load. In cases where the intake flow rate does not come within the target range (NO in the step S25), the control computer 28E feedback controls the valve opening degree of the flow rate adjusting valve 29B (step S26). The feedback control of the valve opening degree of the flow rate adjusting valve 29B corresponds to correcting the valve opening degree of the flow rate adjusting valve 29B in such a manner that the intake flow rate comes within the target range.

In cases where the intake flow rate comes within the target range (YES in step S25), the control computer 28E judges whether or not the time of control that has elapsed in step S24 has reached a regeneration predetermined time that has been set in advance (step S27). In cases where the time of control that has elapsed in step S24 reaches the regeneration predetermined time set in advance (YES in step S27), the control computer 28E restores control of the exhaust throttle valves 35A and 35B and the flow rate adjusting valves 29A and 29B to normal control (step S28).

The control computer 28E judges whether or not the time of control that has elapsed in step S28 has reached the predetermined time set in advance (step S29). In cases where the elapsed time of control in step S28 reaches the predetermined time set in advance (YES in step S29), the control computer 28E proceeds to step S30. The control in step S30 corresponds to a compensation control of increasing the valve opening degree in the exhaust throttle valve 35A as well as lowering the valve opening degree in the exhaust throttle valve 35B, and lowering the valve opening degree of the flow rate adjusting valve 29A as well as increasing the valve opening degree of the flow rate adjusting valve 29B. The exhaust flow rate in the exhaust passage 20B is decreased by lowering the valve opening degree in the exhaust throttle valve 35B, and the exhaust gas temperature in the exhaust passage 20B is increased. The valve opening degree of the exhaust throttle valve 35B after the valve opening degree has been lowered (the exhaust flow rate in the exhaust passage 20B after the valve opening degree has been lowered) is set in such a manner that the exhaust gas temperature in the exhaust passage 20B reaches a suitable temperature for burning out black smoke particles collected in the purifier 25D.

The amount of increase in the supply flow rate of the exhaust gas flowing to the branch intake passage 16B via the second exhaust gas supply passage 24B is equal to the amount of decrease in the discharge flow rate of the exhaust gas discharged from the exhaust passage 20B to the outside. Further, the initial value of the amount of decrease in the supply flow rate of exhaust gas flowing to the branch intake passage 16A via the first exhaust gas supply passage 24A is equal to the initial value of the amount of increase in the discharge flow rate of the exhaust gas discharged from the exhaust passage 20A to the outside. Further, the amount of increase in the supply flow rate of exhaust gas flowing to the branch intake passage 16B via the second exhaust gas supply passage 24B is equal the initial value of the amount of decrease in the supply flow rate of the exhaust gas flowing to the branch intake passage 16A via the first exhaust gas supply passage 24A.

The control computer 28E judges whether or not the intake flow rate detected by the air flowmeters 23A and 23B is within the target range (step S31). In cases where the intake flow rate is not within the target range (NO in step S31), the control computer 28E feedback controls the valve opening of the flow rate adjusting valve 29A (step S32). The feedback control of the valve opening degree of the flow rate adjusting valve 29A corresponds to correcting the valve opening degree of the flow rate adjusting valve 29A in such a manner that the intake flow rate enters the target range.

In cases where the intake flow rate is within the target range (YES in step S31), the control computer 28E judges whether or not the time of control that has elapsed in the step S30 reaches the regeneration predetermined time that has been set in advance (step S33). In cases where the time of the control that has elapsed in the step S30 reaches the regeneration predetermined time that has been set in advance (YES in step S33), the control computer 28E returns the control of the exhaust throttle valves 35A and 35B and the flow rate adjusting valves 29A and 29B to the normal control (step S34).

After the process of step S34, the control computer 28E proceeds to the process in step S21.

The exhaust throttle valve 35A corresponds to the discharge flow rate adjuster that adjusts the discharge flow rate of the exhaust gas discharged from the first exhaust path. The exhaust throttle valve 35B corresponds to the discharge flow rate adjuster adjusting the discharge flow rate of the exhaust gas discharged from the second exhaust path. The combination of the exhaust throttle valve 35A and the flow rate adjusting valve 29A and the combination of the exhaust throttle valve 35B and the flow rate adjusting valve 29B each constitute a supply flow rate adjuster that adjusts the supply flow rate of exhaust gas supplied to the intake path from the corresponding exhaust path via the corresponding exhaust gas supply path. Further, the combination of the exhaust throttle valve 35A and the flow rate adjusting valve 29A and the combination of the exhaust throttle valve 35B and the flow rate adjusting valve 29B each constitute a flow rate adjuster that adjusts the discharge flow rate of exhaust gas discharged from the corresponding exhaust path and the supply flow rate of exhaust gas supplied to the intake path from the corresponding exhaust path via the corresponding exhaust gas supply path. The control computer 28E corresponds to the control section controlling the flow rate adjusting state in a plurality of flow rate adjusters. The flow rate adjusting state in the flow rate adjuster in this case means the adjusting state of the magnitude of the valve opening degrees in the exhaust throttle valves 35A and 35B, and the adjusting state of the magnitude of the valve opening degrees in the flow rate adjusting valves 29A and 29B.

In the third embodiment, the same advantages can be obtained as in item (1-1) in the first embodiment.

Since it takes longer to regenerate the purifiers 25C and 25D than in the case of regenerating the purifiers 25A and 25B using the NOx catalyst, there is a strong possibility that the engine speed will be changed during the regeneration of the purifiers 25C and 25D. In other words, there is a strong possibility that the intake flow rate will be changed during the regeneration of the purifiers 25C and 25D. It is possible to control the intake flow rate within the target range even under the regeneration of the purifiers 25C and 25D, by feedback controlling the exhaust gas supply flow rate in such a manner that the intake flow rate remains within the target range, whereby the torque shock is suppressed.

Further, in the third embodiment, in the vehicle additionally provided with the exhaust throttle valves 35A and 35B, a new mechanism for increasing and decreasing the discharge flow rate of the exhaust gas from the exhaust passages 20A and 20B is not necessary. Accordingly, in the vehicle designed such that the exhaust throttle valves 35A and 35B are additionally provided for assisting braking, it is possible to execute regeneration of a pair of purifiers 25C and 25D without adding any new mechanism for increasing and decreasing the discharge flow rate of the exhaust gas from the exhaust passages 20A and 20B.

The present invention may be embodied in the following manner.

(1) In the first and second embodiments, the reducing agent is supplied over the entire period for regenerating the purifiers 25A and 25B. However, the structure may be made such that the reducing agent is supplied for only a part of the regenerating period of the purifiers 25A and 25B (for example, just after the start of regeneration).

(2) In the third embodiment, the structure may be made such that the fuel injection period in the group of the cylinders 12A is elongated as a means of increasing the exhaust gas temperature in the exhaust passage 20A, at a time that the purifier 25C is regenerated. In the same manner, the structure may be made such that the fuel injection period in the cylinder 12B group is elongated as a means of increasing the exhaust gas temperature in the exhaust passage 20B, at a time that the purifier 25D is generated.

(3) In the first embodiment, the structure may be made such that the temperature detector is also provided in the exhaust passage 20B, and only the purifier 25A is regenerated in cases where regenerating conditions of the purifier 25A are established and regenerating conditions of the purifier 25B are not established. In the same manner, the structure may be made such that only the purifier 25B is regenerated in cases where the regenerating conditions of the purifier 25B are established and the regenerating condition of the purifier 25A are not established.

(4) In the first embodiment, the temperature within the purifier 25A may be detected instead of detecting the exhaust gas temperature within the exhaust passage 20A.

(5) In the first embodiment, the structure may be made such that when the purifiers 25A and 25B are generated, the valve opening degrees of the flow rate adjusting valves 29A and 29B are controlled so as to be increased and decreased, and the vane opening degrees of the superchargers 19A and 19B are not controlled so as to be increased and decreased. In this case, the flow rate adjusting valves 29A and 29B constitute a flow rate adjuster (a discharge flow rate adjuster and a supply flow rate adjuster).

(6) The present invention may be applied to an exhaust gas purifying apparatus in an internal combustion engine provided with three or more exhaust paths in parallel. In such a case, it is possible to control in such a way as to compensate the supply flow rate adjusting state in a plurality of supply flow rate adjusters so as to increase the flow rate in the exhaust gas supplying path in the purifier which is regenerated, and decrease the flow rate in the other at least one exhaust gas supply path.

(7) The present invention may be applied to an exhaust gas purifying apparatus using a nitrogen oxide reduction occlusion type catalyst carried on a particulate filter of a diesel engine.

The invention claimed is:

1. An exhaust gas purifying apparatus in an internal combustion engine having an intake path, and first and second exhaust paths, the exhaust paths being arranged in parallel, the apparatus comprising:
- an exhaust gas purifier that is provided at least in the first exhaust path;
- a first exhaust gas supply path for supplying exhaust gas from the first exhaust path to the intake path;
- a second exhaust gas supply path for supplying exhaust gas from the second exhaust path to the intake path;
- a merging portion at which the exhaust gas supplied to the intake path from the first exhaust path and the exhaust gas supplied to the intake path from the second exhaust path merge;
- a discharge flow rate adjuster configured to adjust an exhaust flow rate of exhaust gas discharged from the first exhaust path;
- a supply flow rate adjuster configured to adjust a supply flow rate of exhaust gas supplied to the intake path via the second exhaust gas supply path; and
- a control section configured to control the discharge flow rate adjuster and the supply flow rate adjuster in response to a process for regenerating the purifier, wherein the control section controls the discharge flow rate adjuster so as to reduce the discharge flow rate of exhaust gas discharged from the first exhaust path, and controls the supply flow rate adjuster so as to reduce the supply flow rate of exhaust gas supplied to the intake path via the second exhaust gas supply path.

2. The apparatus according to claim 1, wherein, when the process for regenerating the purifier is executed, the control section controls the discharge flow rate adjuster and the supply flow rate adjuster such that the amount of increase in the flow rate of exhaust gas that passes through the first exhaust gas supply path becomes equal to the amount of decrease in the flow rate of exhaust gas that passes through the second exhaust gas supply path.

3. The apparatus according to claim 1, wherein the discharge flow rate adjuster reduces the flow rate of exhaust gas discharged from the first exhaust path, thereby increasing the flow rate of exhaust gas supplied to the intake path via the first exhaust gas supply path.

4. The apparatus according to claim 1, further comprising a variable nozzle type turbocharger that supplies air by using an exhaust gas flow, wherein the exhaust flow rate adjuster includes a turbine portion of the variable nozzle type turbocharger, and wherein the first exhaust gas supply path is connected to a section of the first exhaust path that is upstream of the turbine portion.

5. The apparatus according to claim 1, wherein the supply flow rate adjuster includes a flow rate adjusting valve provided on the second exhaust gas supply path.

6. The apparatus according to claim 1, wherein the discharge flow rate adjuster is a first discharge flow rate adjuster, wherein the supply flow rate adjuster includes a second discharge flow rate adjuster that adjusts a flow rate of exhaust gas discharged from the second exhaust path, and wherein the second discharge flow rate adjuster increases the flow rate of exhaust gas discharged from the second exhaust path, thereby reducing the flow rate of exhaust gas supplied to the intake path via the second exhaust gas supply path.

7. The apparatus according to claim 6, wherein, when the process for regenerating the purifier is executed, the control section controls the first and second discharge flow rate adjusters such that the amount of decrease in the flow rate of exhaust gas discharged from the first exhaust path becomes equal to the amount of increase in the flow rate of exhaust gas discharged from the second exhaust path.

8. The apparatus according to claim 1, wherein the purifier is a first purifier, the apparatus further comprising a second exhaust gas purifier provided in the second exhaust path.

9. The apparatus according to claim 8, wherein, immediately after executing a process for regenerating one of the first and second purifiers, the control section executes a process for regenerating the other purifier.

10. The apparatus according to claim 1, wherein the purifier has a NOx catalyst.

11. The apparatus according to claim 10, further comprising a reducing agent supplying device that supplies a reducing agent to the purifier, thereby regenerating the purifier.

12. An exhaust gas purifying apparatus in an internal combustion engine having an intake path, and first and second exhaust paths, the exhaust paths being arranged in parallel, the apparatus comprising:
- a first exhaust gas purifier that is provided in the first exhaust path;
- a second exhaust gas purifier that is provided in the second exhaust path;
- a first exhaust gas supply path for supplying exhaust gas from the first exhaust path to the intake path;
- a second exhaust gas supply path for supplying exhaust gas from the second exhaust path to the intake path;
- a merging portion at which the exhaust gas supplied to the intake path from the first exhaust path and the exhaust gas supplied to the intake path from the second exhaust path merge;
- a first flow rate adjuster configured to adjust a discharge flow rate of exhaust gas discharged from the first exhaust path, and a supply flow rate of exhaust gas supplied to the intake path via the first exhaust gas supply path;
- a second flow rate adjuster configured to adjust a discharge flow rate of exhaust gas discharged from the second exhaust path, and a supply flow rate of exhaust gas supplied to the intake path via the second exhaust gas supply path; and
- a control section configure to control the first and second flow rate adjusters in response to a process for regenerating one of the first and second purifiers, wherein the control section controls one of the flow rate adjusters that corresponds to the purifier subjected to the regenerating process so as to reduce the exhaust gas discharge flow rate in the corresponding exhaust path and to increase the exhaust gas supply flow rate in the corresponding exhaust gas supply path, and the control section controls the flow rate adjuster that corresponds to the purifier not subjected to the regenerating process so as to increase the exhaust gas discharge flow rate in the corresponding exhaust path, and to reduce the exhaust gas supply flow rate in the corresponding exhaust gas supply path.

13. The apparatus according to claim 12, wherein, when the process for regenerating the one of the purifiers is executed, the control section controls the first and second flow rate adjusters such that the amount of increase in the exhaust gas supply flow rate in the exhaust gas supply path that corresponds to the purifier subjected to the regenerating process becomes equal to the amount of decrease in the exhaust gas supply flow rate in the exhaust gas supply path that corresponds to the purifier not subjected to the purifying process.

14. The apparatus according to claim 12, wherein, when the process for regenerating the one of the purifiers is executed, the control section controls the first and second flow rate adjusters such that the amount of decrease in the exhaust gas discharge flow rate in the exhaust path that corresponds to the purifier subjected to the regenerating process becomes equal to the amount of increase in the exhaust gas discharge flow rate in the exhaust path that corresponds to the purifier not subjected to the purifying process.

15. An exhaust gas purifying method in an internal combustion engine having an intake path, first and second exhaust paths arranged in parallel, and an exhaust gas purifier provided at least in the first exhaust path, the method comprising:

supplying exhaust gas from the first exhaust path to the intake path through a first exhaust gas supply path;

supplying exhaust gas from the second exhaust path to the intake path through a second exhaust gas supply path;

causing the exhaust gas supplied to the intake path from the first exhaust path and the exhaust gas supplied to the intake path from the second exhaust path to merge;

executing a process for regenerating the purifier; and reducing the flow rate of exhaust gas discharged from the first exhaust path and the flow rate of exhaust gas supplied to the intake path via the second exhaust gas supply path in response to executing the process for regenerating the purifier.

* * * * *